United States Patent
Seo et al.

(10) Patent No.: US 10,059,331 B2
(45) Date of Patent: Aug. 28, 2018

(54) APPARATUS AND METHOD FOR CONTROLLING AUTONOMOUS PARKING SYSTEM

(71) Applicant: HYUNDAI MOTOR COMPANY, Seoul (KR)

(72) Inventors: Gil Won Seo, Hwaseong-si (KR); Sung Yun Kim, Seoul (KR); Min Wook Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 253 days.

(21) Appl. No.: 14/951,447

(22) Filed: Nov. 24, 2015

(65) Prior Publication Data

US 2017/0021828 A1 Jan. 26, 2017

(30) Foreign Application Priority Data

Jul. 21, 2015 (KR) ........................ 10-2015-0103187

(51) Int. Cl.
| | |
|---|---|
| *B60W 30/06* | (2006.01) |
| *B60W 10/18* | (2012.01) |
| *B60W 10/10* | (2012.01) |
| *B62D 15/02* | (2006.01) |

(52) U.S. Cl.
CPC ............ *B60W 30/06* (2013.01); *B60W 10/10* (2013.01); *B60W 10/182* (2013.01); *B62D 15/0285* (2013.01); *B60W 2550/10* (2013.01); *B60W 2710/10* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 2011/0254675 A1* | 10/2011 | Koehler | ............... B60K 28/066 340/439 |
| 2014/0088814 A1 | 3/2014 | You et al. | |

FOREIGN PATENT DOCUMENTS

| | | |
|---|---|---|
| JP | 2002-089314 A | 3/2002 |
| JP | 2004-050925 A | 2/2004 |
| JP | 2006-113894 A | 4/2006 |
| JP | 2006-302187 A | 11/2006 |
| JP | 2007-001475 A | 1/2007 |
| JP | 2013-249878 A | 12/2013 |
| KR | 10-2012-0040789 A | 4/2012 |
| KR | 10-2012-0043545 A | 5/2012 |
| KR | 10-1371478 B1 | 3/2014 |
| KR | 10-2014-0043536 A | 4/2014 |

* cited by examiner

*Primary Examiner* — John Olszewski
*Assistant Examiner* — Gerrad A Foster
(74) *Attorney, Agent, or Firm* — McDermott Will & Emery LLP

(57) ABSTRACT

An apparatus for controlling an autonomous parking system includes a data collection unit for collecting various data, a brake unit for stopping a vehicle, a communication unit for transmitting a message notifying an occurrence of an unexpected incident to a user terminal, and a controller for analyzing various data collected by the data collection unit and determining whether the unexpected incident occurs during autonomous parking, and for controlling the brake unit to stop the vehicle when the unexpected incident occurs.

10 Claims, 2 Drawing Sheets

APPARATUS AND METHOD FOR CONTROLLING AUTONOMOUS PARKING SYSTEM

CROSS-REFERENCE TO RELATED APPLICATION

This application claims the benefit of priority to Korean Patent Application No. 10-2015-0103187, filed on Jul. 21, 2015 with the Korean Intellectual Property Office, the disclosure of which is incorporated herein in its entirety by reference.

TECHNICAL FIELD

The present disclosure relates to an apparatus and a method for controlling an autonomous parking system, and more particularly, to a technology of preventing material and personnel accidents when unexpected incidents occur during autonomous parking.

BACKGROUND

In general, an autonomous parking system finds a parking slot in a parking lot by itself in a state in which a driver does not get in a vehicle and performs an autonomous parking in a pertinent parking slot, and turns off an ignition of the vehicle when the parking is completed.

In addition, the autonomous parking system performs a leaving of the parking lot after turning on the ignition of the vehicle according to a request from the driver and performs autonomous navigation to a place requested by the driver.

For example, when the driver requests a parking operation using a smart phone after getting out of the vehicle at a parking lot entrance, the autonomous parking system enters into the parking lot through autonomous navigation and finds a parking slot to perform a parking by itself. Thereafter, when the driver requests a leaving operation from the parking lot using the smart phone, the autonomous parking system performs autonomous navigation to the parking lot entrance from a parking position in the parking lot.

Therefore, it is not necessary for the driver to enter the parking lot and it is possible to reduce a time required to perform the parking after searching a parking slot.

Since a driver does not get into a vehicle when using the autonomous parking system, the autonomous parking system should guarantee greater safety than a Smart Parking Assist System (SPAS) that requires a driver who operates the transmission, throttle or brakes, or a combination thereof.

However, since the conventional autonomous parking system does not offer a countermeasure for various unexpected incidents, if an unexpected incident occurs, this may lead to accident.

In particular, in the process of searching a parking slot after entering the parking lot through autonomous navigation, when an obstacle is detected suddenly during the autonomous navigation, a system error may occur as the next process is not completed.

SUMMARY OF THE DISCLOSURE

The present disclosure has been made in view of the above problems, and provides an apparatus and a method for controlling a safety in an autonomous parking system which stops a vehicle when unexpected incident occurs during autonomous navigation, determines whether to resume driving for a certain time, and resumes autonomous navigation or notifies the occurrence of the unexpected incident to a driver, thereby preventing accident that may occur during autonomous parking in advance.

In accordance with an aspect of the present disclosure, an apparatus for controlling a safety in an autonomous parking system includes: a data collection unit configured to collect various data; a brake unit configured to stop a vehicle; a communication unit configured to transmit a message notifying occurrence of unexpected incident to a user terminal; and a controller configured to analyze various data collected by the data collection unit and to determine whether unexpected incident occurs during autonomous parking, and to control the brake unit to stop the vehicle when unexpected incident occurs.

In accordance with another aspect of the present disclosure, a method for controlling a safety in an autonomous parking system includes: collecting various data by a data collection unit; analyzing the collected various data and determining whether unexpected incident occurs during autonomous parking, and controlling a brake unit to stop a vehicle when unexpected incident occurs, by a controller; and stopping the vehicle with the brake unit.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
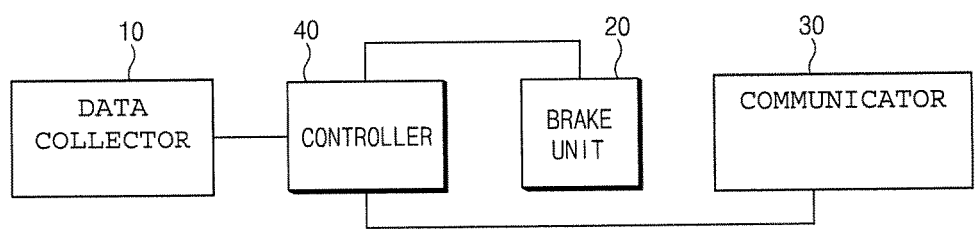
FIG. 1 is a block diagram illustrating a configuration of an apparatus for controlling an autonomous parking system according to an embodiment of the present disclosure.

FIG. 1 is a block diagram illustrating a configuration of an apparatus for controlling an autonomous parking system according to an embodiment of the present disclosure.

Referring to FIG. 1, the apparatus for controlling an autonomous parking system according to an embodiment of the present disclosure may include a data collection unit 10, a brake unit 20, a communication unit 30, and a controller 40.

Among the above mentioned elements, first, the data collection unit 10 may be a module for collecting various types of data required for autonomous parking. For example, the data collection unit 10 may collect various types of data from a laser scanner, a navigation having an accurate map for parking lot, GPS, an inertial measurement unit (IMU), an around view monitoring (AVM) system, an ultrasonic sensor, a wheel speed sensor, electronic control units (ECU), an engine management system (EMS), an electronic stability control (ESC) system, an electric parking brake (EPB) system, a motor driven power steering (MDPS) system, an electronic transmission (E-Shifter), and the like.

In this case, the data collection unit 10 may collect various types of data from the electronic control units (ECU), the engine management system (EMS), the electronic stability control (ESC) system, the electric parking brake (EPB) system, the motor driven power steering (MDPS) system, and the electronic transmission (E-Shifter) through a vehicle network. Here, the vehicle network may include a controller area network (CAN), a local interconnect network (LIN), FlexRay, a media oriented system transport (MOST), and the like.

Next, the brake unit 20 may be a module for applying a braking force to a wheel of the vehicle, and may decelerate or stop the vehicle, for example, by pressurizing a wheel disc by a brake pad.

Next, the communication unit 30 may transmit a message notifying the occurrence of an unexpected incident to a user terminal. In this case, the user terminal may include a smart key capable of performing wireless communication, and at least one smart phone. That is, a plurality of user terminals may be assigned, and the communication unit 30 may transmit a notification message to each assigned user terminal.

Next, the controller 40 may perform an overall control so that the above mentioned elements may perform their own functions normally during autonomous parking.

In particular, the controller 40 may determine the occurrence of the unexpected incident during the autonomous parking by analyzing various data collected by the data collection unit 10. At this time, the occurrence of the unexpected incident may include the case in which an obstacle (e.g., pedestrians, pets, bikes, etc.) exists on an autonomous parking path, the case in which a temporary failure occurs in an actuator (the term for a steering system and/or a braking system), the case in which a vacant parking slot in the parking lot is not searched, the case in which a GPS error occurs, and the like.

In addition, when an unexpected incident occurs, the controller 40 may control the brake unit 20 to stop the vehicle, and periodically determine whether the unexpected incident is removed for a certain preset time (e.g., thirty seconds, one minute, etc.).

In this case, in the process of determining whether the unexpected incident is removed, when an obstacle (e.g., pedestrians, pets, bikes, etc.) occurs on an autonomous parking path, the parking path is periodically scanned based on a surrounding data collection device such as a laser scanner, and it is determined that the unexpected incident is removed when the obstacle is removed, whereas it is determined that the unexpected incident is not removed when the obstacle is not removed.

In addition, in the case of a temporary failure in an actuator, it is determined that the unexpected incident is removed when a signal indicating that a corresponding unit operates normally from ECU, EPB, MDPS, and the like in a preset time, whereas it is determined that the unexpected incident is not removed when the signal is not received in a preset time.

In addition, in case a vacant parking slot in the parking lot is not searched, it is determined that the unexpected incident is removed when the vacant parking slot is searched in a preset time, whereas it is determined that the unexpected incident is not removed when the vacant parking slot is not searched.

In addition, in case a GPS error occurs, it is determined that the unexpected incident is removed when the GPS error is resolved in a preset time, whereas it is determined that the unexpected incident is not removed when the GPS error is not resolved.

Based on the determination result, if the unexpected incident is not removed in a preset time, the controller 40 may transmit a notification to the user terminal via the communication unit 30.

Based on the determination result, if the unexpected incident is removed in a preset time, the controller 40 may resume the autonomous parking.

For example, with respect to the case in which an obstacle (e.g., pedestrians, pets, bikes, etc.) exists on an autonomous parking path, the case in which a temporary failure occurs in an actuator (the term for a steering system and/or a braking system), the case in which a GPS error occurs, if the unexpected incident is removed in a preset time, the autonomous parking may be resumed, whereas if the unexpected incident is not removed in a preset time, a notification may be transmitted to the user terminal.

For another example, in case a vacant parking slot in the parking lot is not searched, a notification may be transmitted to the user terminal after moving to a preset safety zone. In this case, the safety zone is a zone which does not hinder the parking of other vehicles, and in which the vehicle is able to wait for a certain time.

Additionally, the present disclosure further includes a transmission unit and an Electric Parking Brake (EPB), and the controller 40 may control the transmission unit to locate the position of a gear in a parking (P) stage after the vehicle is stopped, thereby engaging (fixing to prevent the vehicle from being moved) the EPB. In this case, although the vehicle is stopped by the brake unit 20, if the gear is located in a driving (D) stage or in a reverse (R) stage, there is a risk of moving the vehicle regardless of the driver's intention. Accordingly, the present disclosure may change the position of the gear and engage the EPB so as to achieve a greater degree of safety.

In the above mentioned present disclosure, the countermeasure for an unexpected incident is described on the assumption that the driver does not get into the vehicle. However, it is preferable that the same countermeasure is also applied for an unexpected incident caused by the driver in a state in which the driver gets in the vehicle.

For example, during the autonomous parking by the autonomous parking system, if the driver operates a driver steering wheel, a transmission, a brake pedal, an accelerator pedal, an autonomous parking related button of a smart phone, a door, a trunk, another vehicle mounted system, and the like, the controller 40 may not perform immediately the operation related to a corresponding manipulation, but may stop the vehicle by the brake unit 20 to guide the transfer of a control for the vehicle and release the autonomous parking function. At this time, the controller 40 may guide the transfer of a control through an Audio Video Navigation (AVN) system of the vehicle, or may guide the transfer of a control through the smart phone of the driver.

Figure 2:
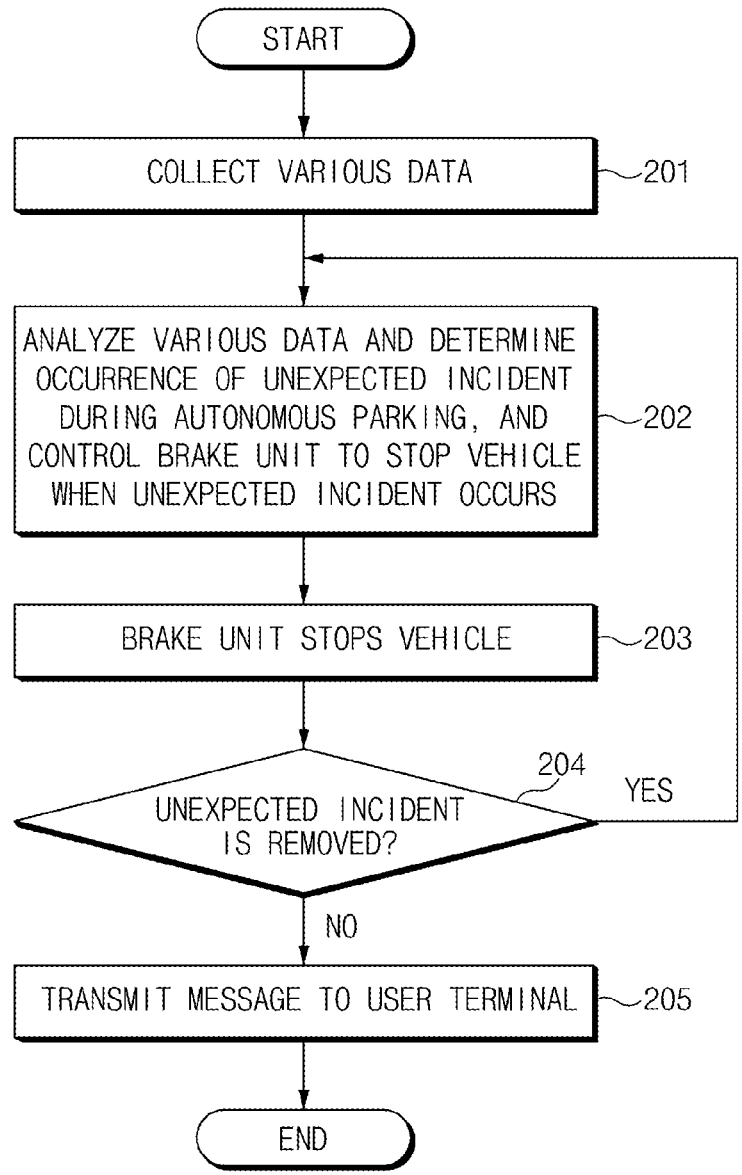
FIG. 2 is a flowchart illustrating a method for controlling an autonomous parking system according to an embodiment of the present disclosure.

FIG. 2 is a flowchart illustrating a method for controlling an autonomous parking system according to an embodiment of the present disclosure.

First, the data collection unit 10 may collect various data (201).

Then, the controller 40 may analyze various data collected by the data collection unit 10 and determine the occurrence of an unexpected incident during the autonomous parking, and control the brake unit 20 to stop the vehicle when an unexpected incident occurs (202).

Next, the brake unit 20 may apply a braking force to a wheel of the vehicle to stop the vehicle (203).

Then, the controller 40 may determine periodically whether the unexpected incident is removed for a critical time (204).

Based on the determination (204), if the unexpected incident is not removed, the controller 40 may transmit a notification message to one or more user terminals (205). Obviously, if the unexpected incident is removed, the controller 40 may resume the autonomous parking.

As described above, the present disclosure stops a vehicle when an unexpected incident occurs during autonomous navigation, determines whether to resume driving for a certain time, and resumes autonomous navigation or notifies the occurrence of the unexpected incident to a driver, thereby preventing an accident that may occur during autonomous parking in advance.

The foregoing method of the present disclosure may be implemented in a program command form executable by various computer means and be recorded in a computer readable recording medium. In this case, the computer readable recording medium may include a program command, a data file, and a data structure individually or a combination thereof. Further, the program command includes a machine language code created by a compiler and a high-level language code executable by a computer using an interpreter. The foregoing hardware device may be configured to be operated according to at least one software module to perform an operation of the present disclosure, or software modules may be configured to be operated according to the hardware device.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. An apparatus for controlling an autonomous parking system, the apparatus comprising: a data collector configured to collect various data; a brake for stopping a vehicle; a communicator configured to transmit a message notifying an occurrence of an unexpected incident to a user terminal; and a controller configured to search a vacant parking space in a parking lot, and to analyze various data collected by the data collector, to determine whether the unexpected incident occurs during autonomous parking, and to control the brake to stop the vehicle when the unexpected incident occurs, wherein the unexpected incident comprises a case in which the vacant parking space cannot be searched in the parking lot.

2. The apparatus of claim 1, wherein the controller determines periodically whether the unexpected incident is removed for a critical time after the vehicle is stopped, resumes the autonomous parking if the unexpected incident is removed, and controls the communicator to transmit the message to at least one user terminal if the unexpected incident is not removed.

3. The apparatus of claim 1, wherein the controller moves the vehicle to a preset safety zone after the vehicle is stopped when the unexpected incident occurs.

4. The apparatus of claim 1, wherein the communicator transmits the message to a plurality of preset terminals.

5. The apparatus of claim 1, further comprising a transmission and an electric parking brake (EPB),
wherein the controller controls the transmission to locate a position of a gear in a parking (P) stage after the vehicle is stopped, and engages the EPB.

6. A method for controlling an autonomous parking system, the method comprising: collecting various data by a data collector; analyzing the collected various data and determining whether an unexpected incident occurs during autonomous parking, and controlling a brake to stop a vehicle when the unexpected incident occurs, by a controller, and stopping the vehicle with the brake, wherein the unexpected incident comprises a case in which a vacant parking space cannot be searched in a parking lot.

7. The method of claim 6, further comprising:
determining, by the controller, periodically whether the unexpected incident is removed for a critical time, after the vehicle is stopped;
resuming autonomous parking if the unexpected incident is removed, based on a determination result; and
controlling a communicator to transmit a notification message to at least one user terminal if the unexpected incident is not removed, based on the determination result.

8. The method of claim 6, further comprising moving the vehicle to a preset safety zone by the controller after the vehicle is stopped when the unexpected incident occurs.

9. The method of claim 7, wherein the user terminal is at least one preset terminal.

10. The method of claim 6, further comprising:
controlling a transmission to locate a position of a gear in a parking (P) stage, after the vehicle is stopped; and
engaging an electric parking brake (EPB).

* * * * *